United States Patent
Yang

(10) Patent No.: US 7,899,501 B2
(45) Date of Patent: Mar. 1, 2011

(54) AUXILIARY POWER MANAGEMENT METHOD FOR CELLULAR BASED DEVICE

(75) Inventor: Wan-ping Yang, Farmington-Hills, MI (US)

(73) Assignee: DENSO International America, Inc., Southfield, MI (US)

( * ) Notice: Subject to any disclaimer, the term of this patent is extended or adjusted under 35 U.S.C. 154(b) by 547 days.

(21) Appl. No.: 12/080,219

(22) Filed: Mar. 31, 2008

(65) Prior Publication Data

US 2009/0247240 A1    Oct. 1, 2009

(51) Int. Cl.
*H04B 1/38* (2006.01)
(52) U.S. Cl. .................. 455/572; 455/573
(58) Field of Classification Search .......... None
See application file for complete search history.

(56) References Cited

U.S. PATENT DOCUMENTS

| | | | |
|---|---|---|---|
| 6,178,523 B1 * | 1/2001 | Klein .................. | 714/24 |
| 6,332,196 B1 * | 12/2001 | Kawasaki et al. ........ | 713/300 |
| 7,177,963 B2 * | 2/2007 | Burns et al. .............. | 710/52 |
| 7,216,250 B2 * | 5/2007 | Matsuoka et al. ........ | 713/503 |
| 2003/0093189 A1 * | 5/2003 | Honda ..................... | 701/1 |
| 2008/0096662 A1 * | 4/2008 | Kuwahara et al. ........ | 463/41 |

* cited by examiner

*Primary Examiner*—Ajit Patel
(74) *Attorney, Agent, or Firm*—Harness, Dickey & Pierce, PLC

(57) ABSTRACT

A method of operating a control module of a mobile device that communicates with a cellular network and that is powered by an auxiliary power supply comprises generating an interrupt signal based on a tick of a system timer interrupt of the control module; incrementing a counter value based on the interrupt signal; and commanding the auxiliary power supply to cease powering the mobile device when the counter value is greater than or equal to a predetermined value.

28 Claims, 5 Drawing Sheets

AUXILIARY POWER MANAGEMENT METHOD FOR CELLULAR BASED DEVICE

FIELD

The present disclosure relates to a cellular network based mobile device and, more particularly, to a cellular network based mobile device that is powered by an auxiliary power supply.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Cellular network based mobile devices are becoming standard vehicle equipment. A cellular network based mobile device of a vehicle may have to be at least partially running even when the engine of the vehicle is turned off. However, due to restrictions on consuming current from the battery of the vehicle (i.e., auxiliary power of the vehicle), the mobile device may have to turn itself off after a certain time period.

To do so, the auxiliary-powered mobile device may maintain an accurate and uninterruptable clock (i.e., run clock-based logic). One method to maintain the accurate clock is to power the clock with another battery. However, the additional battery may be costly and may itself run out of power to maintain the clock.

Another method to maintain the accurate clock is to synchronize the clock with the cellular network when either the engine or the battery of the vehicle is powering the clock. However, the cellular network may not be available to synchronize the clock. The mobile device may be in a region that does not allow for access to the cellular network. In addition, in both cases, the mobile device may suffer a power glitch that disrupts the clock. Therefore, a new method of determining whether the auxiliary-powered mobile device has to turn itself off is desired.

SUMMARY

A method of operating a control module of a mobile device that communicates with a cellular network and that is powered by an auxiliary power supply comprises generating an interrupt signal based on a tick of a system timer interrupt of the control module; incrementing a counter value based on the interrupt signal; and commanding the auxiliary power supply to cease powering the mobile device when the counter value is greater than or equal to a predetermined value.

A mobile device that communicates with a cellular network and that is powered by an auxiliary power supply comprises a control module and a counter. The control module generates an interrupt signal based on a tick of a system timer interrupt of the control module. The counter increments a counter value based on the interrupt signal. The control module receives the counter value and commands the auxiliary power supply to cease powering the mobile device when the counter value is greater than or equal to a predetermined value.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
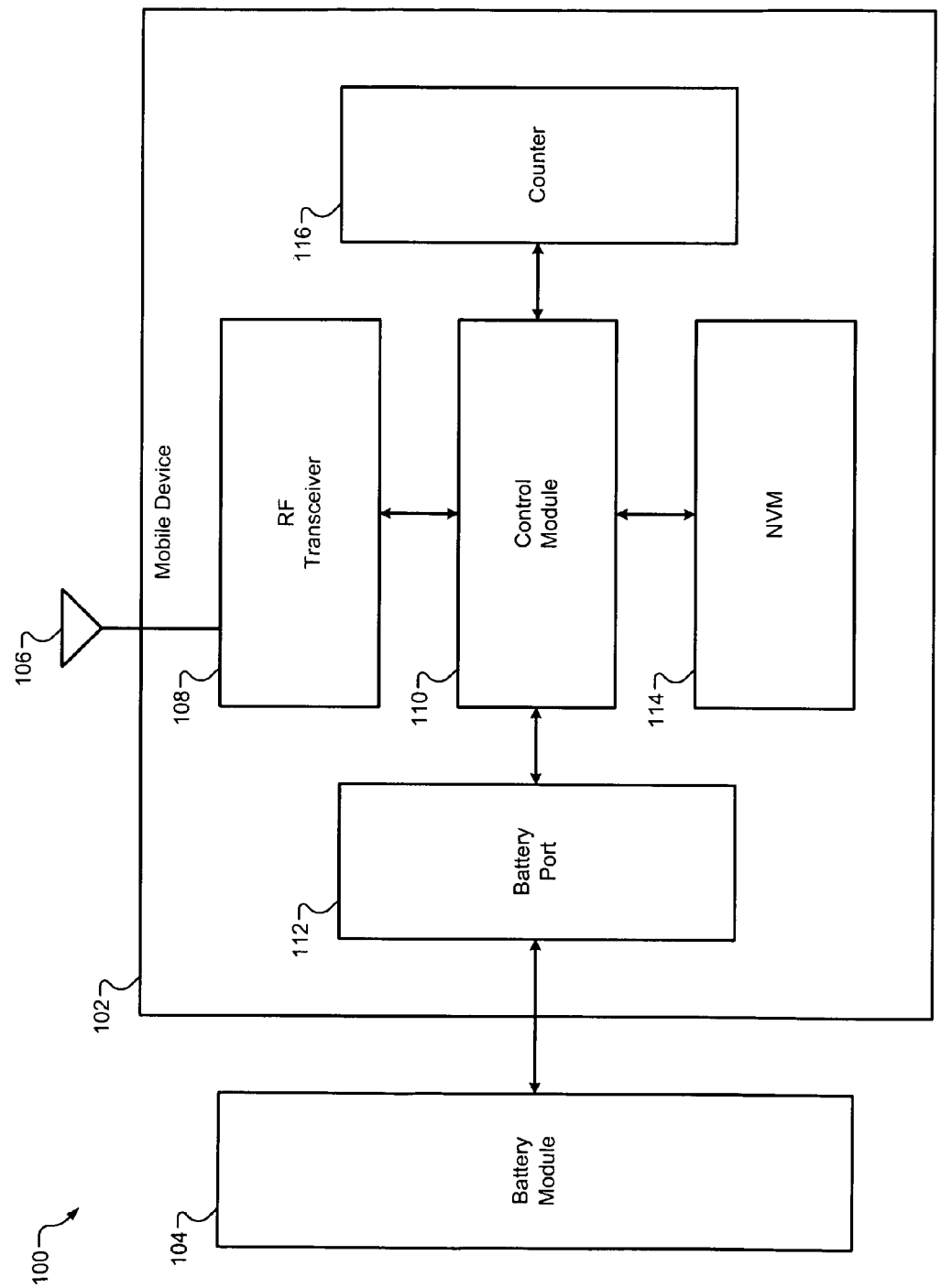
FIG. 1 is a functional block diagram of an exemplary implementation of a mobile device system that uses a cellular network according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

To properly determine whether an auxiliary-powered mobile device that uses a cellular network has to turn itself off, the method of the present disclosure includes running counter-based logic along with clock-based logic. The counter-based logic includes accumulating ticks of system timer interrupts of a processor in the mobile device to determine the duration in which the mobile device has been auxiliary-powered. Running the counter-based logic avoids inaccurate shutdowns of the mobile device due to its clock not being synchronized with the cellular network. In addition, the method includes storing the amount of the accumulated ticks in non-volatile memory (NVM) for ready access. This prevents the counter-based logic from being overly disrupted when a power glitch occurs.

Referring now to FIG. 1, a functional block diagram of an exemplary implementation of a mobile device system 100 that uses a cellular network is presented. The mobile device system 100 includes a mobile device 102 and a battery module 104. For example only, the mobile device 102 may include, but is not limited to, a mobile phone, a handheld game console, a portable media player, a personal digital assistant, and/or a personal navigation device. The mobile device 102 includes a radio antenna 106, a radio frequency (RF) transceiver 108, a control module 110, a battery port 112, NVM 114, and a counter 116.

The RF transceiver 108 receives and transmits RF signals of the cellular network via the radio antenna 106. When the RF transceiver 108 receives an RF signal, the RF transceiver 108 may filter, amplify, demodulate, and/or convert, from analog to digital, the RF signal for use by the mobile device 102. When the RF transceiver 108 receives a data signal from the control module 110, the RF transceiver 108 may convert, from digital to analog, modulate, amplify, and/or filter the data signal before transmitting the data signal as an RF signal.

The battery module 104 includes a battery (not shown) that powers the mobile device 102 via the battery port 112. For example only, the battery may include, but is not limited to, a battery of a vehicle. The control module 110 outputs control signals to the battery module 104 via the battery port 112. A control signal may command the battery module 104 to cease powering the mobile device 102. As a result, the mobile device 102 is turned off.

The NVM 114 retains stored data even when the mobile device 102 is turned off. For example only, the NVM 114 may include, but is not limited to, read-only memory (e.g., Electrically Erasable Programmable Read-Only Memory), flash memory, magnetic computer storage devices, and/or optical disc drives. The control module 110 stores data in the NVM 114 and reads stored data in the NVM 114. When the mobile device 102 starts to use auxiliary power, the control module 110 determines a current time (i.e., a primary off time) based on a clock (not shown) of the mobile device 102. The control module 110 stores the primary off time in the NVM 114.

The control module 110 generates signals that each indicates a tick of a system timer interrupt (i.e., interrupt tick signals) of the control module 110. For example only, each tick of the system timer interrupt may be predetermined to be a millionth of a second in duration. The counter 116 receives the interrupt tick signals and stores the number of times the counter 116 receives an interrupt tick signal (i.e., a counter value). The counter 116 outputs the counter value to the control module 110.

To properly determine whether the mobile device 102 has to turn itself off, the control module 110 may solely run the counter-based logic. In other words, the control module 110 may determine whether the mobile device 102 has to turn itself off solely based on the counter value. However, the control module 110 may run the clock-based logic if the clock of the mobile device 102 is synchronized with the cellular network. Therefore, in another embodiment of the present disclosure, the control module 110 may run the counter-based logic in parallel with the clock-based logic as described in FIG. 2A and FIG. 2B. In another embodiment of the present disclosure, the control module 110 may run the counter-based logic in series with the clock-based logic as described in FIG. 3A and FIG. 3B.

Figure 2A:
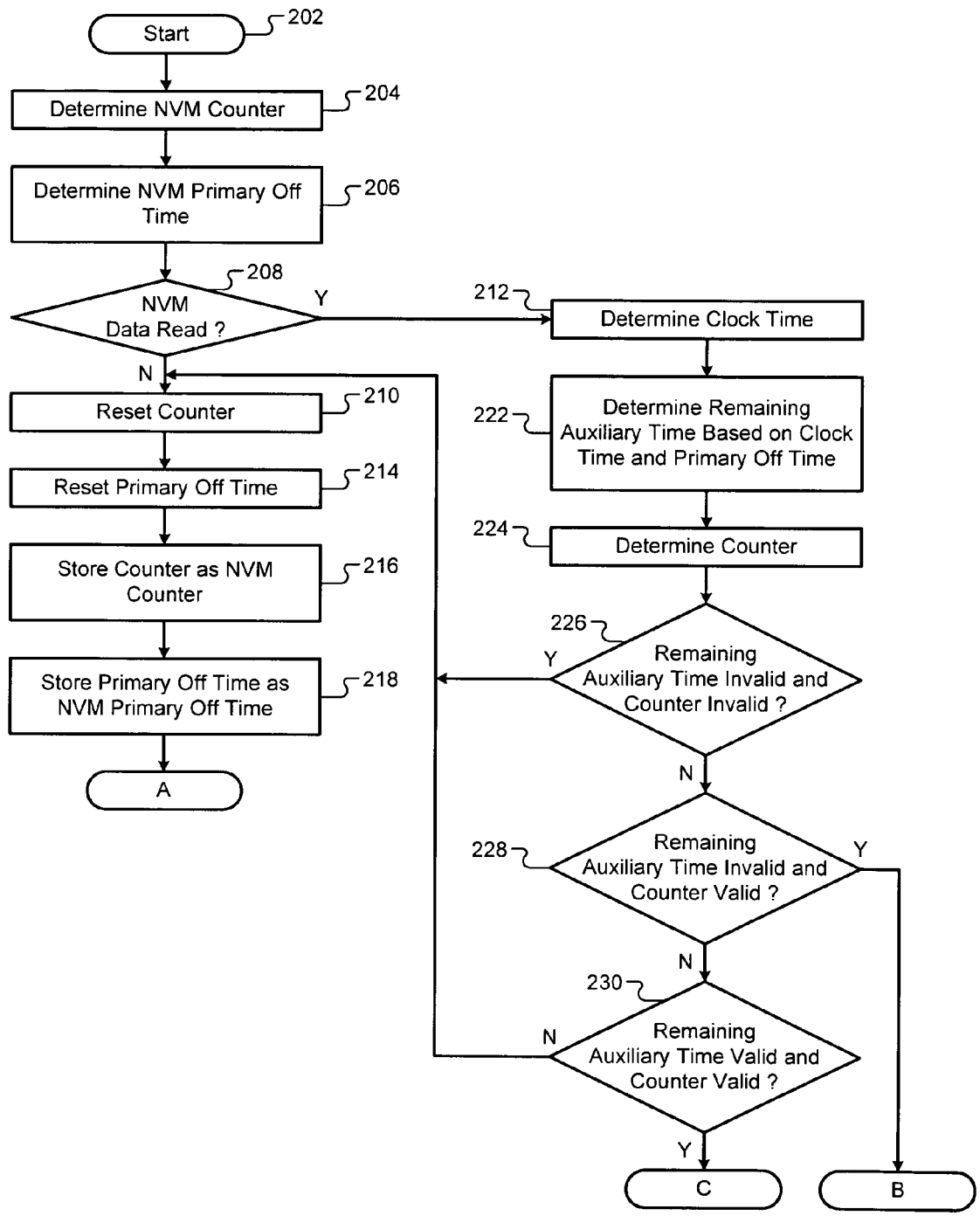
FIG. 2A is a flowchart depicting exemplary steps performed by a control module of the mobile device system that runs clock-based logic in parallel with counter-based logic according to the principles of the present disclosure.
Figure 2B:
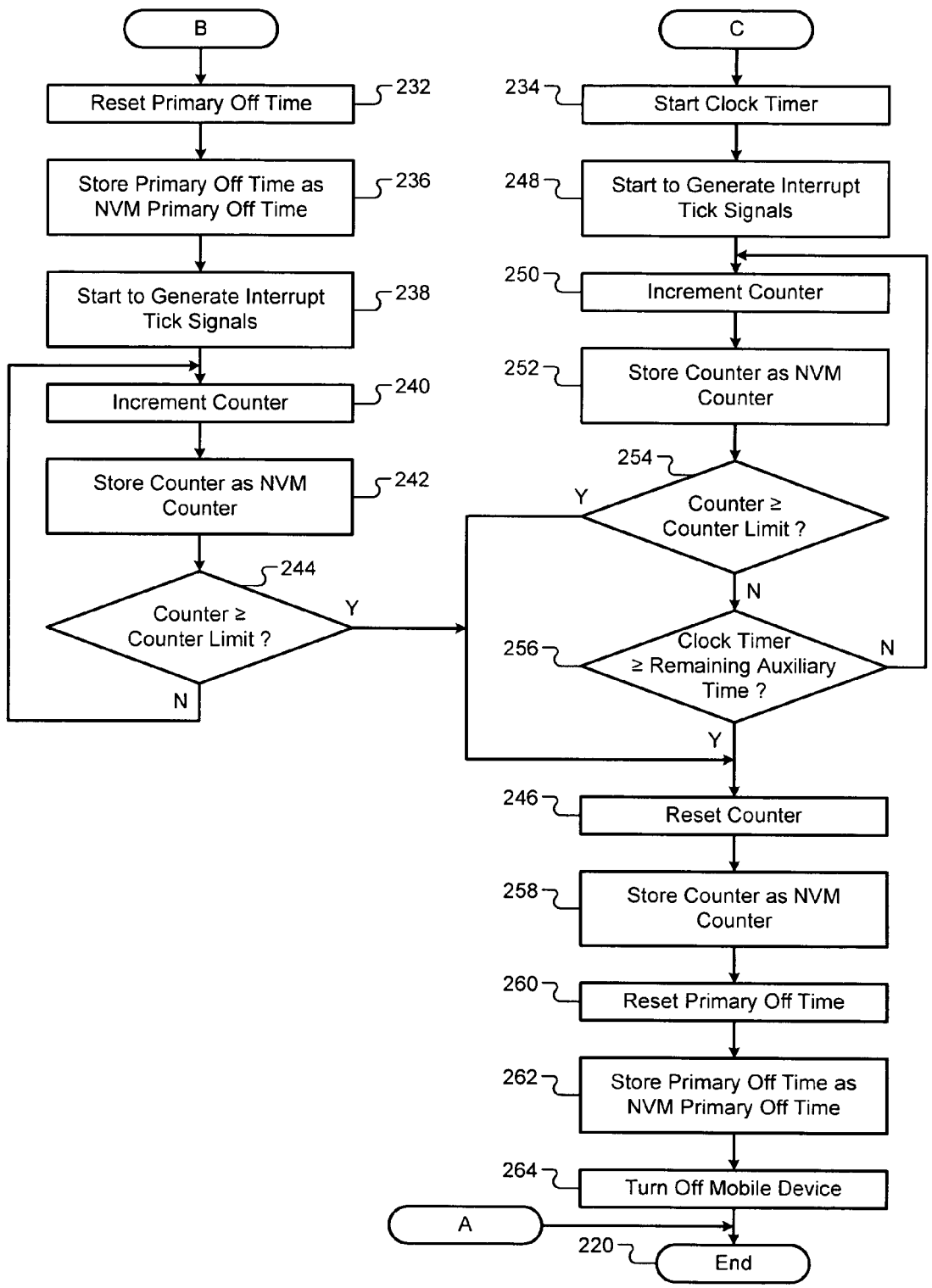
FIG. 2B is a portion of the flowchart of FIG. 2A.

Referring now to FIG. 2A and FIG. 2B, a flowchart depicting exemplary steps performed by the control module 110 when the clock-based logic runs in parallel with the counter-based logic is shown. Control begins in step 202. In step 204, a counter value stored in the NVM 114 (i.e., a NVM counter) is determined.

In step 206, a primary off time stored in the NVM 114 (i.e., a NVM primary off time) is determined. In step 208, control determines whether the NVM counter and the NVM primary off time has been successfully determined, or read, from the NVM 114. If false, control continues in step 210. If true, control continues in step 212.

In step 210, the counter value (i.e., Counter) is reset to zero. In step 214, the primary off time is reset to zero. In step 216, the reset counter value is stored in the NVM 114 as the NVM counter. In step 218, the reset primary off time is stored in the NVM 114 as the NVM primary off time. Control continues in step 220, where control ends because the NVM 114 has failed.

In step 212, a current time of the clock of the mobile device 102 (i.e., a clock time) is determined. In step 222, a remaining time where the mobile device 102 may use auxiliary power (i.e., a remaining auxiliary time) is determined. The remaining auxiliary time is determined based on subtracting the clock time from the sum of the primary off time and a predetermined time period where the mobile device 102 may use auxiliary power.

In step 224, the counter value is determined. In step 226, control determines whether the remaining auxiliary time is invalid and the counter value is invalid. If true, control continues in step 210. If false, control continues in step 228.

The remaining auxiliary time is invalid if the clock is not synchronized with the cellular network. The counter value is invalid if it is not successfully determined, or read, from the counter 116 due to hardware damage, for example. If the counter 116 has failed, control ends after resetting the counter value and the primary off time and storing them in the NVM 114.

In step 228, control determines whether the remaining auxiliary time is invalid and the counter value is valid. If false, control continues in step 230. If true, control continues in step 232, where control starts to run the counter-based logic.

In step 230, control determines whether the remaining auxiliary time is valid and the counter value is valid. If false, control continues in step 210. If true, continues in step 234, where control starts to run the clock-based logic and the counter-based logic. In step 232, the primary off time is reset to zero.

In step 236, the reset primary off time is stored in the NVM 114 as the NVM primary off time. In step 238, the interrupt tick signals are started to be generated. In step 240, the counter value is incremented by outputting the next generated interrupt tick signal to the counter 116.

In step 242, the incremented counter value is stored in the NVM 114 as the NVM counter. In step 244, control determines whether the counter value is greater than or equal to a predetermined maximum counter value where the mobile device 102 has to turn itself off (i.e., a counter limit). If false, control continues returns to step 240. If true, control continues in step 246.

In step 234, a timer (not shown) for the clock-based logic (i.e., a clock timer) is started. In step 248, the interrupt tick signals are started to be generated. In step 250, the counter value is incremented. In step 252, the incremented counter value is stored in the NVM 114 as the NVM counter value.

In step 254, control determines whether the counter value is greater than or equal to the counter limit. If false, control continues in step 256. If true, control continues in step 246. In step 256, control determines whether the clock timer is greater than or equal to the remaining auxiliary time. If false, control returns to step 250. If true, control continues in step 246.

In step 246, the counter value is reset to zero. In step 258, the reset counter value is stored in the NVM 114 as the NVM counter. In step 260, the primary off time is reset to zero. In step 262, the reset primary off time is stored in the NVM 114 as the NVM primary off time. In step 264, the mobile device 102 is turned off via a control signal from the control module 110 to the battery module 104. Control ends in step 220.

Figure 3A:
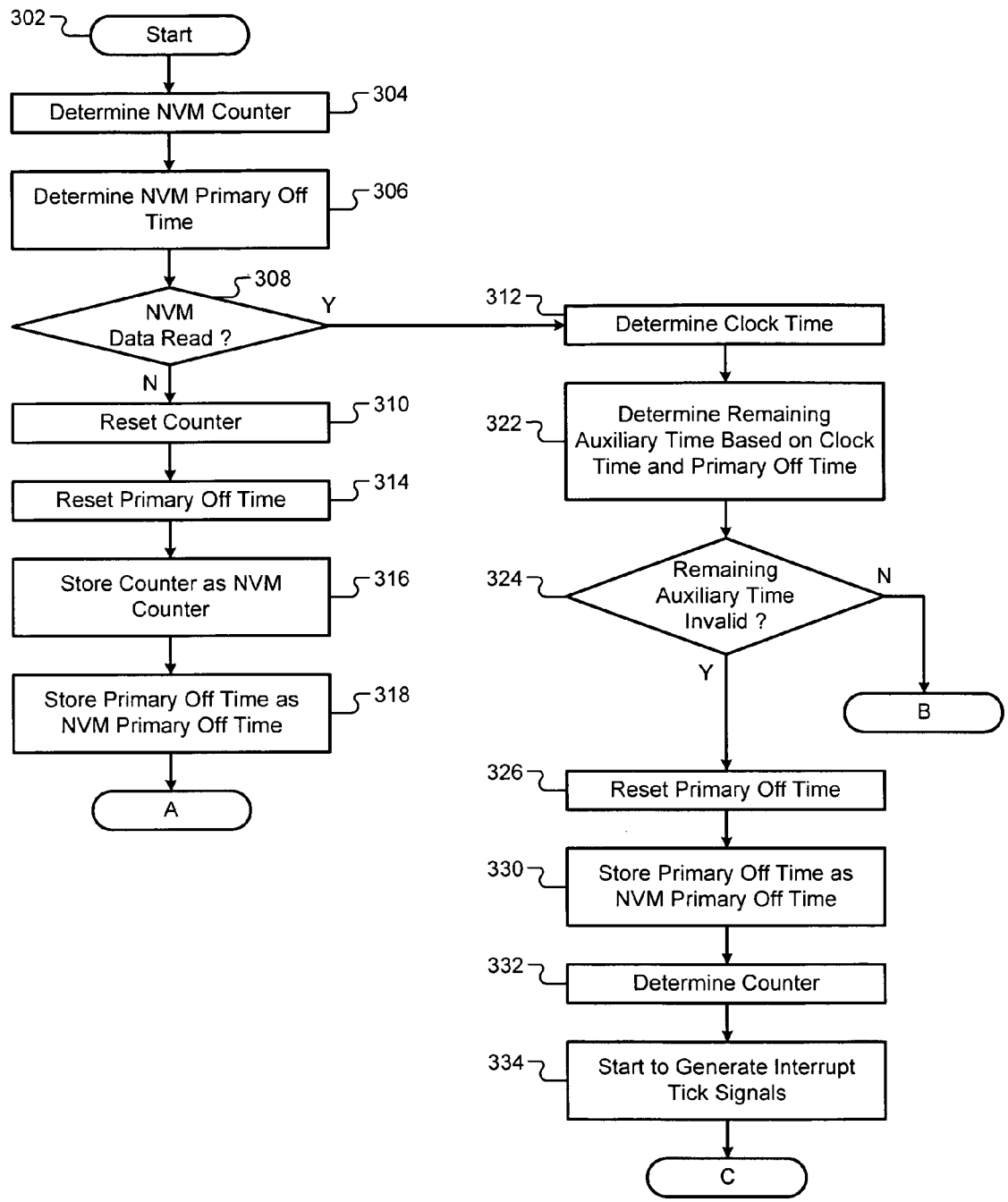
FIG. 3A is a flowchart depicting exemplary steps performed by the control module that runs the clock-based logic in series with the counter-based logic according to the principles of the present disclosure.
Figure 3B:
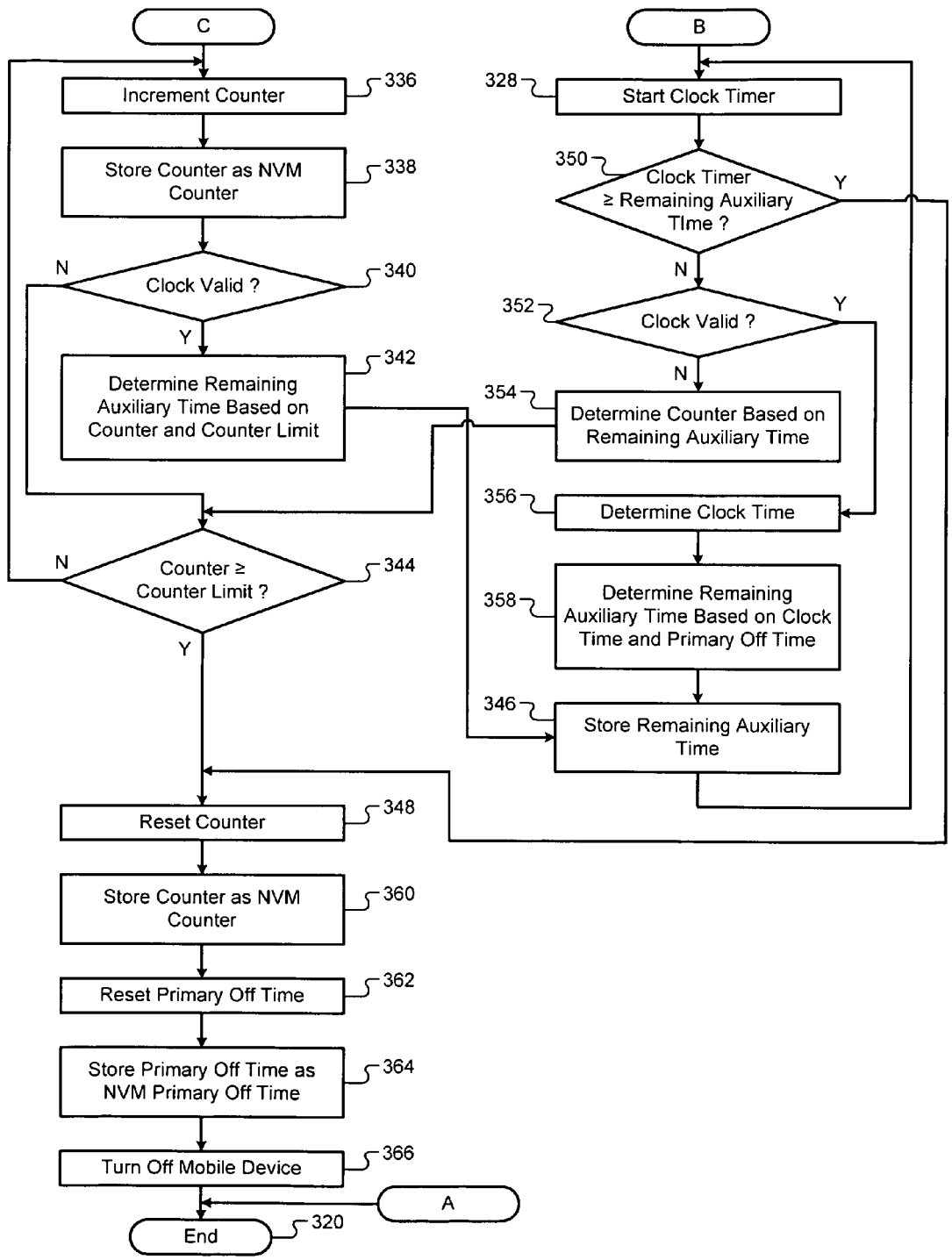
FIG. 3B is a portion of the flowchart of FIG. 3A.

Referring now to FIG. 3A and FIG. 3B, a flowchart depicting exemplary steps performed by the control module 110 when the clock-based logic runs in series with the counter-based logic is shown. Control begins in step 302. In step 304, the NVM counter is determined.

In step 306, the NVM primary off time is determined. In step 308, control determines whether the NVM counter and the NVM primary off time has been successfully read from the NVM 114. If false, control continues in step 310. If true, control continues in step 312.

In step 310, the counter value is reset to zero. In step 314, the primary off time is reset to zero. In step 316, the reset counter value is stored in the NVM 114 as the NVM counter. In step 318, the reset primary off time is stored in the NVM 114 as the NVM primary off time. Control continues in step 320, where control ends because the NVM 114 has failed.

In step 312, the clock time is determined. In step 322, the remaining auxiliary time is determined based on the clock time, the primary off time, and the predetermined time period where the mobile device 102 may use auxiliary power. In step 324, control determines whether the remaining auxiliary time is invalid. If true, control continues in step 326, where control starts to run the counter-based logic. If false, control continues in step 328, where control starts to run clock-based logic.

In step 326, the primary off time is reset to zero. In step 330, the reset primary off time is stored in the NVM 114 as the NVM primary off time. In step 332, the counter value is determined. In step 334, the interrupt tick signals are started to be generated.

In step 336, the counter value is incremented. In step 338, the incremented counter value is stored in the NVM 114 as the NVM counter. In step 340, control determines whether the clock is valid. If true, control continues in step 342, where control starts to run clock-based logic instead of counter-based logic. If false, control continues in step 344. The clock is valid if it is synchronized with the cellular network.

In step 342, the remaining auxiliary time is determined based on subtracting the counter value from the counter limit and multiplying the difference by the predetermined duration of each tick of the system timer interrupt. Control continues in step 346. In step 344, control determines whether the counter value is greater than or equal to the counter limit. If false, control returns to step 336. If true, control continues in step 348.

In step 328, the clock timer is determined. In step 350, control determines whether the clock timer is greater than or equal to the remaining auxiliary time. If false, control continues in step 352. If true, control continues in step 348. In step 352, control determines whether the clock is valid. If false, control continues in step 354, where control starts to run the counter-based logic instead of the clock-based logic. If true, control continues in step 356.

In step 354, the counter value is determined based on subtracting the remaining auxiliary time from the predetermined time period where the mobile device 102 may use auxiliary power and dividing the difference by the predetermined duration of each tick of the system timer interrupt. Control continues in step 344. In step 356, the clock time is determined.

In step 358, the remaining auxiliary time is determined based on the clock time, the primary off time, and the predetermined time period where the mobile device 102 may use auxiliary power. In step 346, the remaining auxiliary time is stored in the NVM 114. Control returns to step 328.

In step 348, the counter value is reset to zero. In step 360, the counter value is stored in the NVM 114 as the NVM counter. In step 362, the primary off time is reset to zero. In step 364, the primary off time is stored in the NVM 114 as the NVM primary off time. In step 366, the mobile device 102 is turned off via a control signal from the control module 110 to the battery module 104. Control ends in step 320.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A method of operating a control module of a mobile device that communicates with a cellular network and that is powered by an auxiliary power supply, comprising:
   generating an interrupt signal based on a tick of a system timer interrupt of the control module;
   incrementing a counter value based on the interrupt signal; and
   commanding the auxiliary power supply to cease powering the mobile device when the counter value is greater than or equal to a predetermined value.

2. The method of claim 1 further comprising storing the counter value in non-volatile memory of the mobile device.

3. The method of claim 2 further comprising retrieving the counter value from the non-volatile memory when a power glitch occurs between the mobile device and the auxiliary power supply.

4. The method of claim 1 further comprising resetting the counter value to zero when non-volatile memory of the mobile device fails.

5. The method of claim 1 further comprising resetting the counter value when the counter value cannot be determined.

6. The method of claim 1 further comprising resetting the counter value when the auxiliary power supply is commanded to cease powering the mobile device.

7. The method of claim 1 further comprising determining a start time of when the auxiliary power supply starts to power the mobile device based on a clock of the mobile device.

8. The method of claim 7 further comprising storing the start time in non-volatile memory of the mobile device.

9. The method of claim 7 further comprising resetting the start time to zero when non-volatile memory of the mobile device fails.

10. The method of claim 7 further comprising resetting the start time when the counter value cannot be determined.

11. The method of claim 7 further comprising resetting the start time when the clock is not synchronized with the cellular network and the counter value can be determined.

12. The method of claim 7 further comprising resetting the start time when the auxiliary power supply is commanded to cease powering the mobile device.

13. The method of claim 7 further comprising commanding the auxiliary power supply to cease powering the mobile device based on the start time, a current time of the clock, and a predetermined time period where the mobile device may use the auxiliary power supply when the clock is synchronized with the cellular network and the counter value can be determined.

14. The method of claim 7 further comprising determining the counter value based on the start time, a current time of the clock, and a predetermined time period where the mobile device may use the auxiliary power supply when the clock is not synchronized with the cellular network.

15. A mobile device that communicates with a cellular network and that is powered by an auxiliary power supply, comprising:

a control module that generates an interrupt signal based on a tick of a system timer interrupt of the control module; and a counter that increments a counter value based on the interrupt signal;

wherein the control module receives the counter value and commands the auxiliary power supply to cease powering the mobile device when the counter value is greater than or equal to a predetermined value.

16. The mobile device of claim 15 wherein the control module stores the counter value in non-volatile memory of the mobile device.

17. The mobile device of claim 16 wherein the control module retrieves the counter value from the non-volatile memory when a power glitch occurs between the mobile device and the auxiliary power supply.

18. The mobile device of claim 15 wherein the control module resets the counter value of the counter to zero when non-volatile memory of the mobile device fails.

19. The mobile device of claim 15 wherein the control module resets the counter value of the counter when the counter value cannot be determined.

20. The mobile device of claim 15 wherein the control module resets the counter value when the auxiliary power supply is commanded to cease powering the mobile device.

21. The mobile device of claim 15 wherein the control module determines a start time of when the auxiliary power supply starts to power the mobile device based on a clock of the mobile device.

22. The mobile device of claim 21 wherein the control module stores the start time in non-volatile memory of the mobile device.

23. The mobile device of claim 21 wherein the control module resets the start time to zero when non-volatile memory of the mobile device fails.

24. The mobile device of claim 21 wherein the control module resets the start time when the counter value cannot be determined.

25. The mobile device of claim 21 wherein the control module resets the start time when the clock is not synchronized with the cellular network and the counter value can be determined.

26. The mobile device of claim 21 wherein the control module resets the start time when the auxiliary power supply is commanded to cease powering the mobile device.

27. The mobile device of claim 21 wherein the control module commands the auxiliary power supply to cease powering the mobile device based on the start time, a current time of the clock, and a predetermined time period where the mobile device may use the auxiliary power supply when the clock is synchronized with the cellular network and the counter value can be determined.

28. The mobile device of claim 21 wherein the control module determines the counter value based on the start time, a current time of the clock, and a predetermined time period where the mobile device may use the auxiliary power supply when the clock is not synchronized with the cellular network.

* * * * *